United States Patent
Shibutani (10) Patent No.: US 7,492,405 B2
(45) Date of Patent: Feb. 17, 2009

(54) CAMERA APPARATUS, DISPLAYING METHOD, AND STORAGE MEDIUM CONTAINING DISPLAYING METHOD

(75) Inventor: Atsushi Shibutani, Tokorozawa (JP)

(73) Assignee: Casio Computer Co., Ltd., Tokyo (JP)

(*) Notice: Subject to any disclaimer, the term of this patent is extended or adjusted under 35 U.S.C. 154(b) by 799 days.

(21) Appl. No.: 10/781,470

(22) Filed: Feb. 17, 2004

(65) Prior Publication Data

US 2004/0165085 A1     Aug. 26, 2004

(30) Foreign Application Priority Data

Feb. 24, 2003   (JP) ............................. 2003-045220

(51) Int. Cl.
*H04N 5/222*   (2006.01)
(52) U.S. Cl. .............................. 348/333.01; 348/333.02
(58) Field of Classification Search ............ 348/333.01, 348/333.02, 333.05, 231.2, 231.3, 231.5, 348/231.6, 333.11, 333.12; 715/705, 707, 715/709; 382/311
See application file for complete search history.

(56) References Cited

U.S. PATENT DOCUMENTS 6,987,535 B1 * 1/2006 Matsugu et al. ............. 348/239

2004/0201741 A1 * 10/2004 Ban ........................ 348/231.3

FOREIGN PATENT DOCUMENTS

| JP | 05-260364 A | 10/1993 |
|----|-------------|---------|
| JP | 05-292358 A | 11/1993 |
| JP | 07-283993 A | 10/1995 |
| JP | 2001-211354 A | 8/2001 |
| JP | 2001-320610 A | 11/2001 |
| JP | 2002-010133 A | 1/2002 |
| JP | 2002-10134 A | 1/2002 |
| JP | 2002-101330 A | 4/2002 |
| JP | 2002-262170 A | 9/2002 |

* cited by examiner

*Primary Examiner*—Yogesh Aggarwal
(74) *Attorney, Agent, or Firm*—Frishauf, Holtz, Goodman & Chick, P.C.

(57) ABSTRACT

A camera apparatus with improved easy-to-operate photographing manipulation. In a standby state in which a photographing scene is selected previously, a sample image representing the selected photographing scene is displayed together with an image of a subject to be photographed. Further, in the standby state, another photographing scene may be selected by a certain key manipulation, and the sample images representing the selectable photographing scene are sequentially displayed together with the subject image.

12 Claims, 10 Drawing Sheets

101 — PARAMETERS TO BE SET IN MENU OR BY KEY OPERATION

| | SCENES | AUTO FOCUS | SHUTTER SPEED | APERTURE | EV SHIFT | SENSITIVITY | FILTER | EXPOSURE MODE | PHOTO-METRY | WB | COLOR EMPHASIS | AMOUNT OF FLASH LIGHT | SHARP-NESS | CHROMA | CONTRAST | FLASH LIGHT |
|---|---|---|---|---|---|---|---|---|---|---|---|---|---|---|---|---|
| 1 | PERSON & SCENERY 1 | AF (AREA 1) | AUTO | AUTO | 0 | STD | × | P (NORMAL) | MULTI | AUTO | × | STD | STD | STD | STD | AUTO |
| 2 | PERSON & SCENERY 2 | AF (AREA 2) | AUTO | AUTO | 0 | STD | × | P (NORMAL) | MULTI | AUTO | × | STD | STD | STD | STD | AUTO |
| 3 | CLOSE UP | AF (AREA 3) | AUTO | AUTO | 0 | STD | × | P (OPEN) | MULTI | AUTO | FLESH COLOR | STD | <SOFT> | STD | STD | AUTO |
| 4 | BUST | AF (AREA 4) | AUTO | AUTO | 0 | STD | × | P (OPEN) | MULTI | AUTO | FLESH COLOR | STD | <SOFT> | STD | STD | AUTO |
| 5 | NEW SHOT | AF (AREA 5) | AUTO | AUTO | 0 | STD | × | P (OPEN) | MULTI | AUTO | FLESH COLOR | STD | <SOFT> | STD | STD | AUTO |
| 6 | TWO SHOTS | AF (AREA 6) | AUTO | AUTO | 0 | STD | × | P (OPEN) | MULTI | AUTO | FLESH COLOR | STD | STD | STD | STD | AUTO |
| 7 | CLOSEUP OF FLOWER | MACRO | AUTO | AUTO | 0 | STD | × | P (OPEN) | MULTI | AUTO | × | LOW | STD | <HIGH> | STD | AUTO |
| 8 | FLOWER FIELD | AF | AUTO | AUTO | −1 | STD | × | P (NORMAL) | CENTER | AUTO | × | STD | STD | <HIGH> | STD | AUTO |
| 9 | WOOD | AF | AUTO | AUTO | 0 | STD | × | P (NORMAL) | MULTI | AUTO | GREEN | STD | | <HIGH> | STD | AUTO |
| 10 | AUTUMN LEAVES | AF | AUTO | AUTO | 0 | STD | × | P (NORMAL) | MULTI | AUTO | RED | STD | | <HIGH> | STD | AUTO |
| 11 | BLUE HEAVEN | ∞ | AUTO | AUTO | 0 | STD | × | P (NORMAL) | MULTI | AUTO | BLUE | STD | STD | STD | STD | AUTO |
| 12 | EVENING SUN | ∞ | AUTO | AUTO | 1 | STD | RED | P (NORMAL) | MULTI | FIXED (SUN LIGHT) | × | STD | STD | HIGH | STD | AUTO |
| 13 | SUMMER SEA | AF | AUTO | AUTO | 1 | STD | × | P (NORMAL) | CENTER | AUTO | BLUE | STD | STD | STD | STD | AUTO |

Fig. 4

| | SCENES | SCENE EXPLANATION | ADVICES | EXPLANATION/CONTROL |
|---|---|---|---|---|
| 1 | PERSON & SCENERY 1 | TAKING A PICTURE OF PERSON & SCENERY | FRAME IS DISPLAYED | |
| 2 | PERSON & SCENERY 2 | TAKING A PICTURE OF PERSON & SCENERY | FRAME IS DISPLAYED | |
| 3 | CLOSE UP | TAKING A PICTURE OF CLOSEUP | FRAME IS DISPLAYED WITH BACKGROUND OUT OF FOCUS WITH ZOOM ON | |
| 4 | BUST | TAKING A PICTURE OF BUST | FRAME IS DISPLAYED WITH BACKGROUND OUT OF FOCUS WITH ZOOM ON | |
| 5 | NEW SHOT | TAKING A PICTURE OF NEW SHOT | FRAME IS DISPLAYED WITH BACKGROUND OUT OF FOCUS WITH ZOOM ON | |
| 6 | TWO SHOTS | TAKING A PICTURE OF TWO SHOTS | FRAME IS DISPLAYED WITH BACKGROUND OUT OF FOCUS WITH ZOOM ON | |
| 7 | CLOSEUP OF FLOWER | TAKING A PICTURE OF CLOSEUP OF FLOWER | | MACRO MODE IS SET WITH ENHANCED CROMA |
| 8 | FLOWER FIELD | TAKING A PICTURE OF FLOWER FIELD | | ENHANCED CROMA IS SET |
| 9 | WOOD | TAKING A PICTURE OF WOOD | | HARD SHARPNESS, ENHANCED CROMA, GREEN EMPHASIZED |
| 10 | AUTUMN LEAVES | TAKING A PICTURE OF AUTUMN LEAVES | | HARD SHARPNESS, ENHANCED CROMA, RED EMPHASIZED |

CAMERA APPARATUS, DISPLAYING METHOD, AND STORAGE MEDIUM CONTAINING DISPLAYING METHOD

BACKGROUND OF THE INVENTION

The present invention relates to a camera apparatus, a displaying method, and a storage medium containing the displaying method. Conventional electronic still cameras are provided with plural photographing modes for photographing a portrait, a scenery and a night scene. In most of these conventional cameras, a user can set the photographing condition most suitable for a subject to be photographed, including a shutter speed, and an aperture by previously selecting a photographing mode. Further, such an electronic still camera is well known as provided with a scene selecting mode (or a best shot mode) in addition to the above photographing modes. (Refer to Japanese Patent Publication Tokkai 2002-10134)

In the photographing mode of the conventional electronic still camera, plural sample images each representing a photographing scene including a subject under a certain photographing condition are displayed on a liquid crystal display in a standby state for taking a picture, and the user previously selects the sample image suitable for the subject to be photographed and as a result of the selection of the sample image, the photographing condition corresponding to the selected sample image is automatically set. As set forth above, the photographing mode allows the user to take a picture under his or her desired photographing condition or under the photographing condition suitable for the photographing scene or the subject under various photographing circumstances.

SUMMARY OF THE INVENTION

A camera apparatus according to the invention, comprises a display device for displaying an image of a subject to be photographed as a through image in a standby state for taking a picture, a memory for recording the image of the subject in response to a photographing manipulation, a controller for setting a photographing condition for taking a picture of the subject in a predetermined photographing mode to a photographing condition suitable for the photographing scene previously selected by a selecting manipulation, and a display controller for causing the display device in the standby state in the photographing mode to display scene information representing the photographing scene together with the through image.

DETAILED DESCRIPTION OF THE PREFERRED EMBODIMENTS

Now, embodiments of the present invention will be described with reference to the accompanying drawings.

[First Embodiment]

Figure 1A:
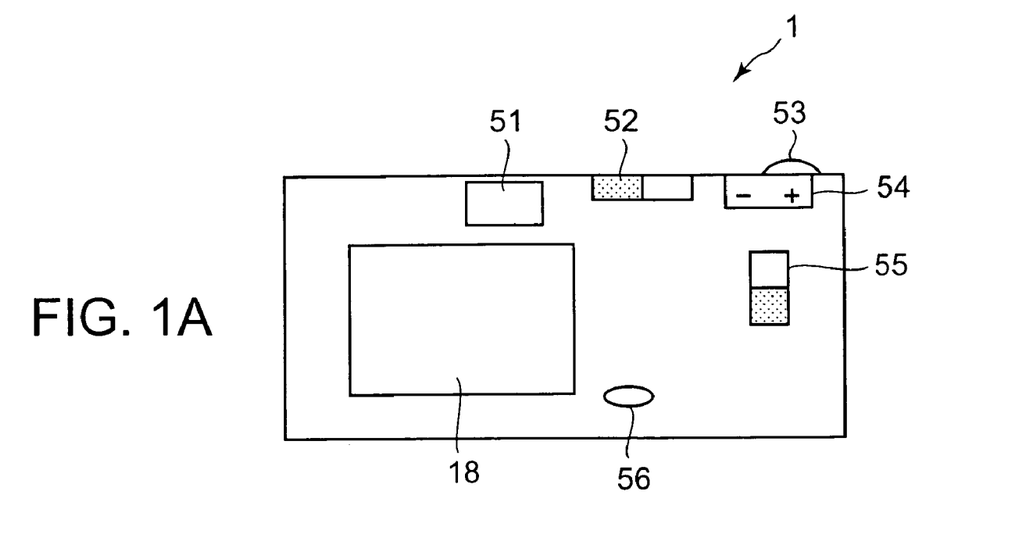
FIGS. 1A, 1B and 1C are schematic views showing external appearances of an electronic still camera according to embodiments of the present invention.
Figure 1B:
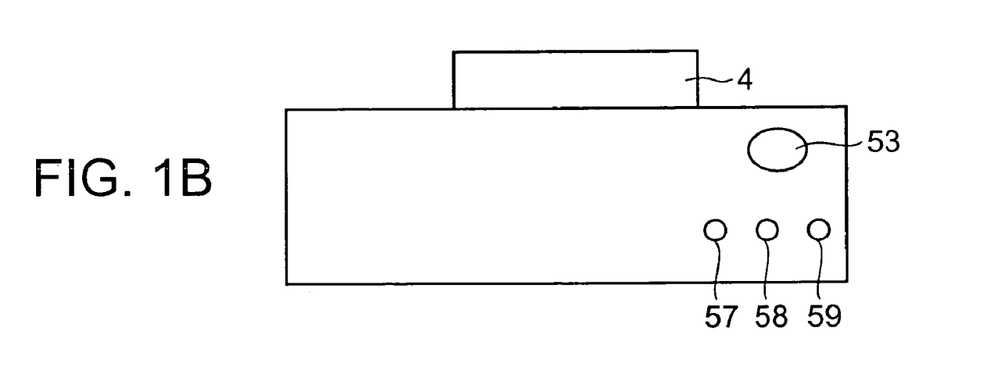
Figure 1C:
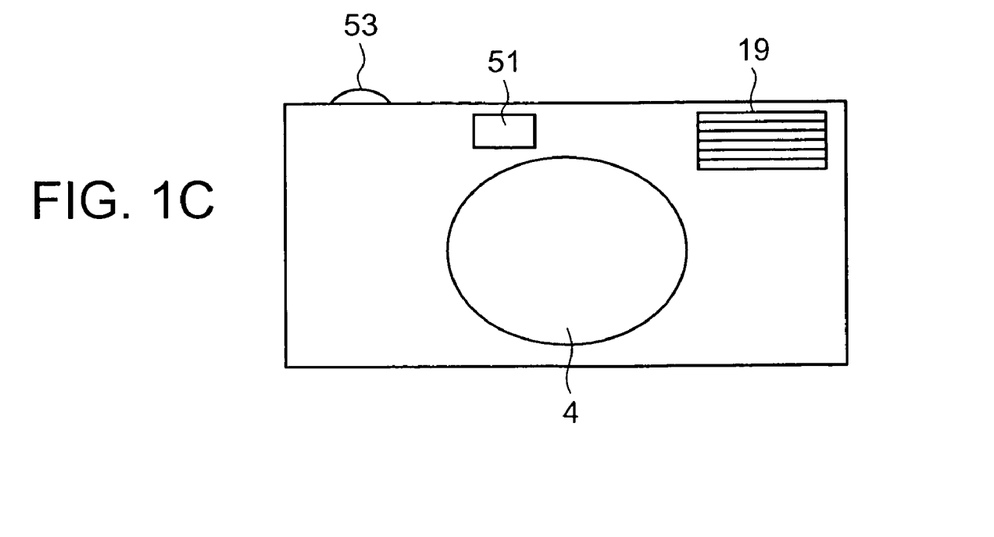

FIGS. 1A, 1B and 1C are schematic views of external appearances of an electronic still camera according to embodiments of the present invention. FIGS. 1A, 1B and 1C are views showing a rear surface, a top and a front surface of the electronic still camera, respectively.

The electronic still camera 1 has a fixed lens 4 in its front surface and a TFT liquid crystal monitor 18 in its rear surface. Further, the electronic still camera 1 has an optical view finder 51 in its rear surface, and a strobe light 19 in its front surface. On its rear surface and its top are provided a power switch 52, a shutter key 53, a zoom operating switch 54, an operation mode selecting switch 55 for selecting one of a recording mode (REC mode) and a reproducing mode (PLAY mode), a liquid crystal display monitor switch 56, and various keys including a flash key 57, a self timer key 58, and a menu key 59.

Figure 2:
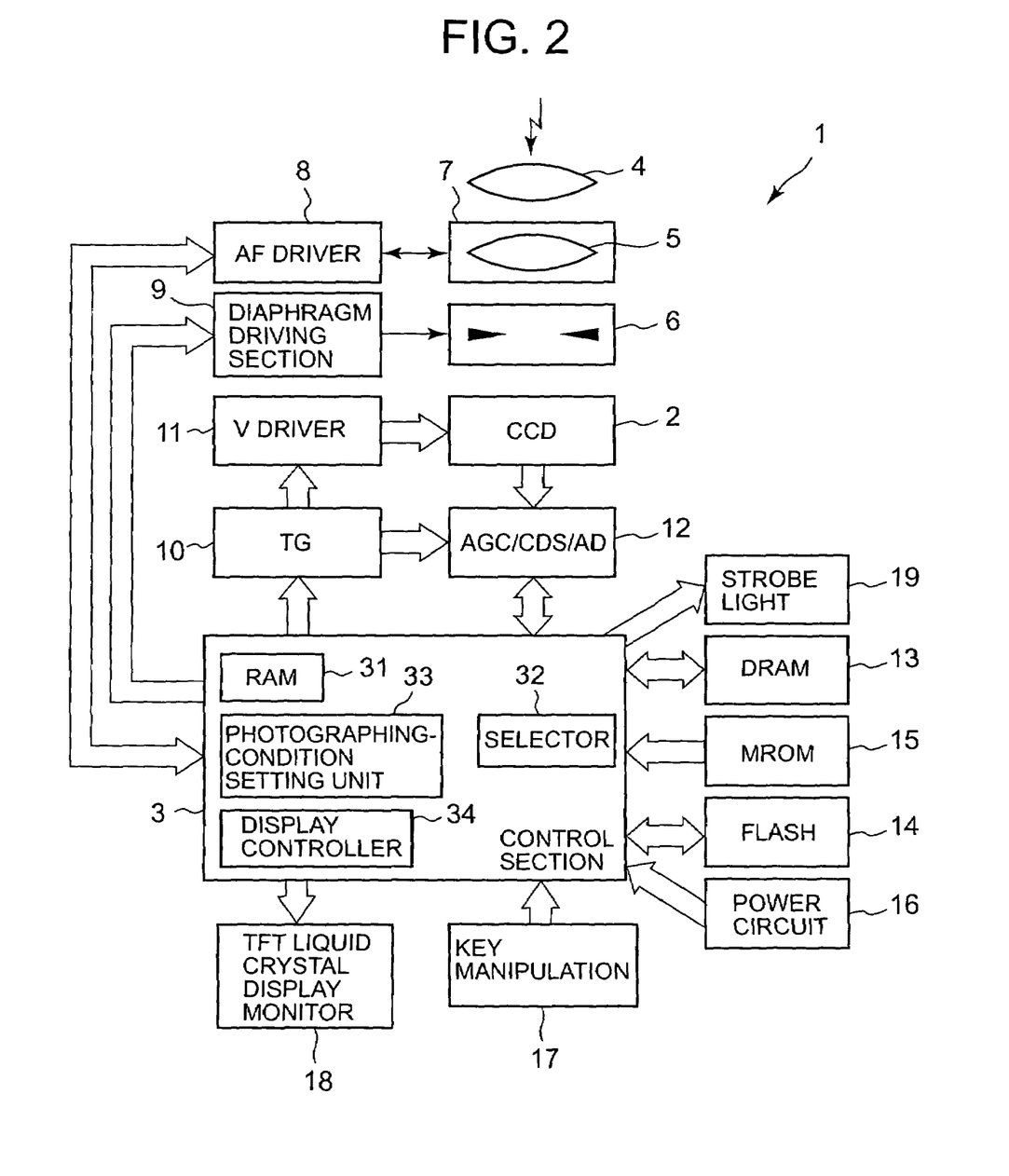
FIG. 2 is a block diagram of a circuit configuration of the electronic still camera of the invention.

FIG. 2 is a block diagram illustrating a circuit configuration of the electronic still camera 1. This electronic still camera 1 is provided with a control section 3 at the center of the circuit configuration, which has an image processing function such as a function for converting a pick-up image obtained by CCD 2 into an electric signal in JPEG format. On a light receiving surface of CCD 2 is focused an optical image of a subject to be photographed passing through the fixed lens 4, a focus lens 5 and an aperture diaphragm 6. The focus lens 5 is held by a driving mechanism 7 including an auto-focusing motor (AF motor). An auto-focusing driver (AF driver) 8 generates and supplies a driving signal to the driving mechanism 7, when it receives a control signal sent from the control section 3. Upon receipt of the driving signal, the driving mechanism 7 performs a focusing operation, moving the focus lens 5 along its optical axis. Receiving a driving signal which a driving section 9 generates and supplies based on a control signal sent from the control section 3, the aperture diaphragm 6 is driven to adjust an amount of light incident to CCD 2 from the subject to be photographed.

Further, the control section 3 is connected with a timing signal generator (TG) 10, which generates and supplies a timing signal to a vertical direction driver (V driver) 11. Upon receipt of the timing signal, the V driver 11 drives CCD 2 and CCD 2 outputs and sends to an unit circuit 12 an analog pick-up image signal corresponding to luminance of the subject to be photographed. The unit circuit 12 removes noise components from the pick-up image signal sent from CCD 2 by using the correlated double sampling technique. The unit circuit 12 includes CDS which serves to hold the pick-up image signal, an automatic gain control amplifier (AGC), which amplifies the pick-up image signal, and an analog-digital converter (AD), which converts the analog pick-up image signal into digital image data. An output signal from CCD 2 is subjected to a sampling process with its black level adjusted to be converted into a digital signal. The digital signal is transferred to the control section 3. The digital signal (a luminance signal) sent to the control section 3 is further sent to DRAM 13 to be temporarily held therein. Meanwhile, the digital signal is subjected to an image processing in various ways in the control section 3, and thus processed signal or an image signal is sent to a flash memory (FLASH) 14 to be stored therein. The image signal is read out to the control section 3 according to need and subjected to various processes such an expansion process, and addition process for combining a luminance signal and color signals to generate a digital video signal and/or an analog video signal.

Further, the control section 3 is connected with MROM (a memory) 15, a power circuit 16, a key operation section 17 including various switches shown in FIGS. 1A, 1B and 1C, the TFT liquid crystal display monitor (a display device) 18, and the strobe light 19. The liquid crystal display monitor 18 displays in the recording mode pick-up images as through images sequentially, and displays in the reproducing mode images based on the analog video signal generated from image data stored in the flash memory 14. The strobe light 19 is driven to generate fill light, if required, when a photographing key is manipulated.

In MROM 15 are stored various data including an operation program for the control section 3. Further, a program AE data is stored in MROM 15, which program AE data defines a program chart indicating combinations of aperture sizes (F) for appropriate exposure values (EV) and shutter speeds. The control section 3 works using a built-in RAM 31 as a working memory in accordance with the operation program to function as a selector 32, a display controller 34, and a photographing-condition setting unit 33. The control section 3 serves to set a time duration for accumulating electric charge for CCD 2, a size of the aperture diaphragm 6, and a gain of AGC. A shutter pulse corresponding to the electric charge accumulation time set by the control section 3 is supplied to the vertical direction driver (V driver) 11 through TG 10. The V driver 11 drives CCD 2 based on the supplied shutter pulse to control an exposure time. In short, CCD 2 serves as an electronic shutter. The operation program stored in MROM 15 includes a program relating focus control, based on which the control section 3 automatically focuses the focus lens 5.

Figure 3:
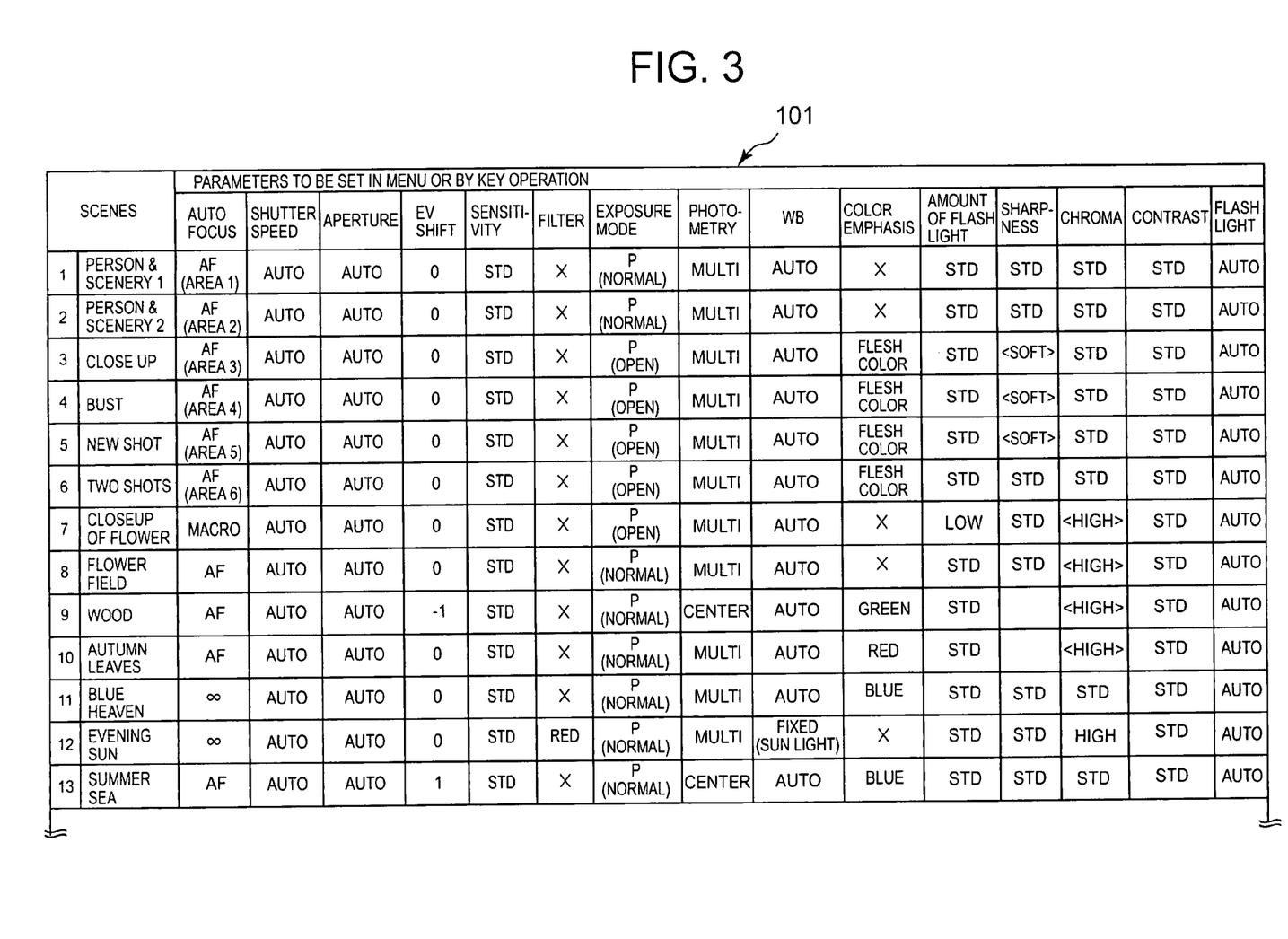
FIG. 3 is a table showing a concept of photographing condition data stored in MROM.
Figure 4:
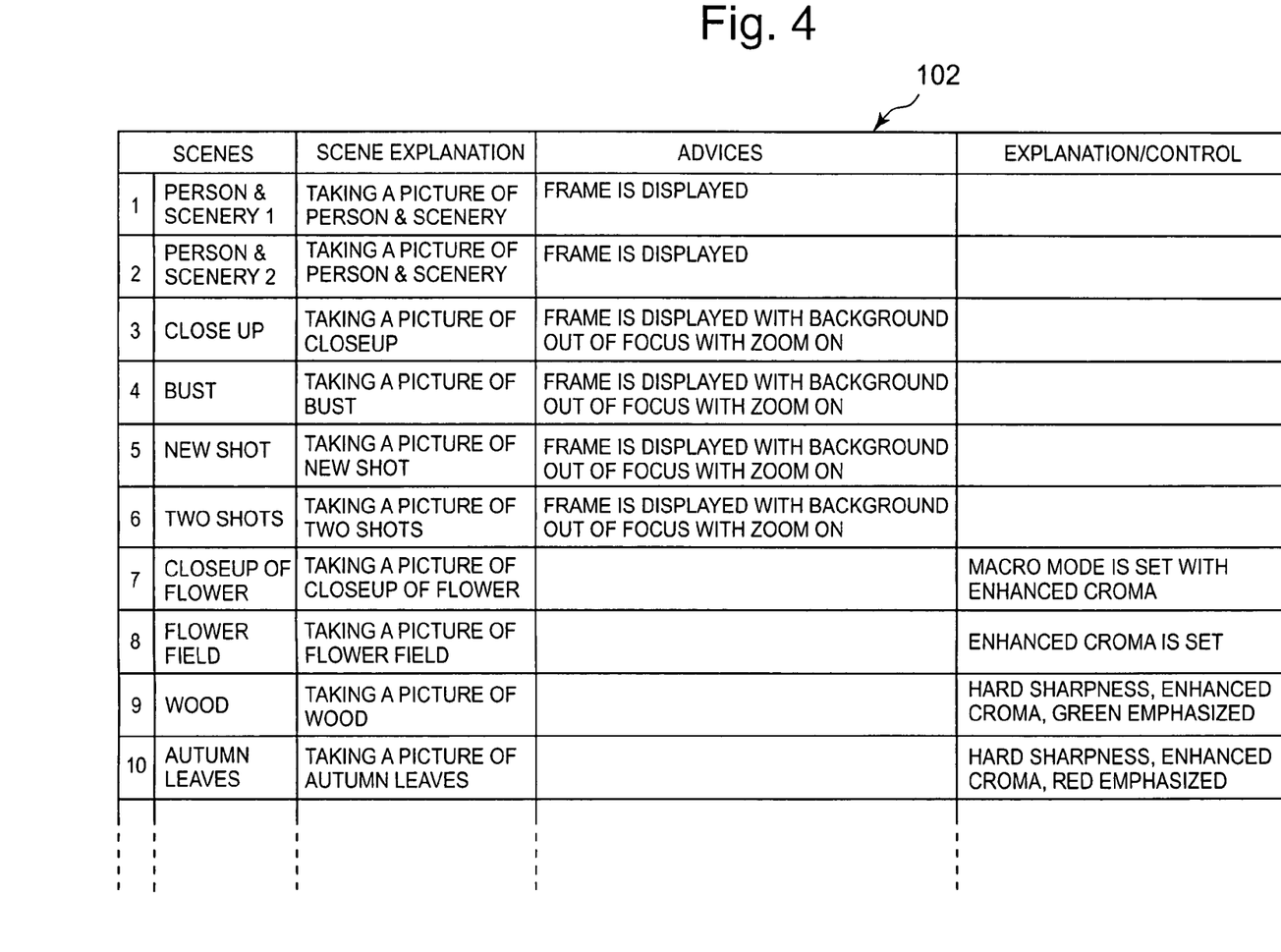
FIG. 4 is a table showing a concept of additional information data stored in MROM.
Figure 5A:
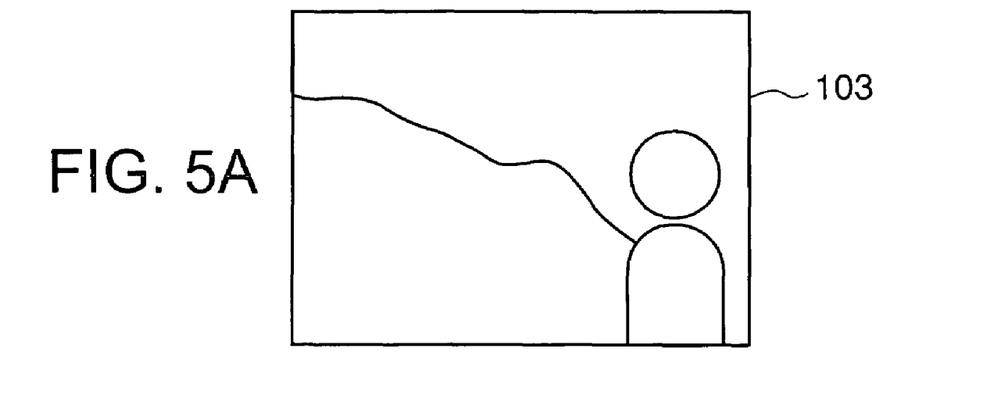
FIGS. 5A, 5B and 5C are views illustrating sample images stored in MROM.
Figure 5B:
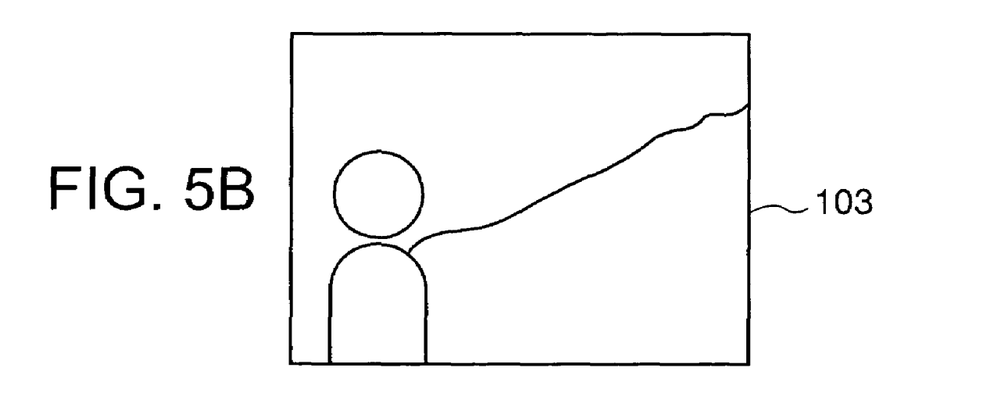
Figure 5C:
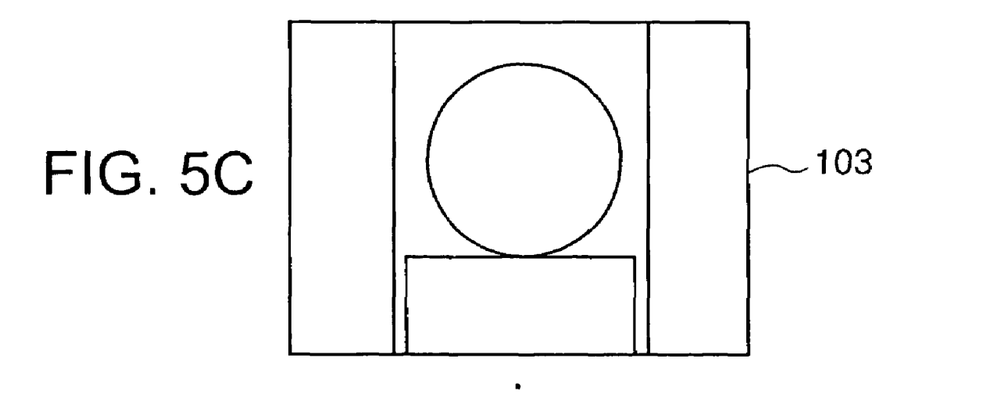

In MROM 15 are stored photographing condition data 101 shown in FIG. 3, additional information data 102 shown in FIG. 4, and image data 103 including plural sample image data as shown in FIGS. 5A, 5B and 5C. Simplified images are shown as sample images in these figures, but data of actually photographed images are stored in MROM 15. The photographing condition data 101 (shown in FIG. 3) are data each indicating a photographing condition for taking a picture with the electronic still camera 1. Each of these photographing conditions corresponds to one of plural scene photographing modes (twenty nine scene photographing modes in the present embodiment), which may be selected when a scene selecting mode is set. More specifically, each photographing condition data 101 comprises plural parameters each indicating one of items to be controlled in the electronic still camera 1, such as an auto-focus operation, a shutter speed, an aperture, an exposure value (EV), sensitivity, filter, and so on.

The additional information data 102 (shown in FIG. 4) are data each corresponding to one of the plural scene photographing modes and are stored together with the photographing condition data 101. More specifically, each additional information data comprises three kinds of message data such as "scene explanation data" advising, for example, "A person and a scene are photographed", "advice data" advising, for example, "Zoom function will make the background out of focus", and "control explanation data" advising, for example, "a macro-mode is set to increase chroma." The sample images 103 illustrated in FIGS. 5A, 5B and 5C correspond to the scene photographing modes respectively and represent images of a person suitable to be photographed in the scene photographing mode. FIG. 5A is a view showing a sample image of <a person and scenery>#1 in the scene photographing mode "1", and FIG. 5B is a view showing a sample image of <a person and scenery>#2 in the scene photographing mode "2", and FIG. 5C is a view showing a sample image of <a close-up scenery> in the scene photographing mode #3.

The program data and others stored in MROM 15 may be stored in other recording medium such as a fixed or detachable recording IC card, if these data are recordable. Further, such arrangement may be employed, that the program data and others are transferred from a separate apparatus through a communication section of other devices such as a personal computer or through the Internet.

Figure 6:
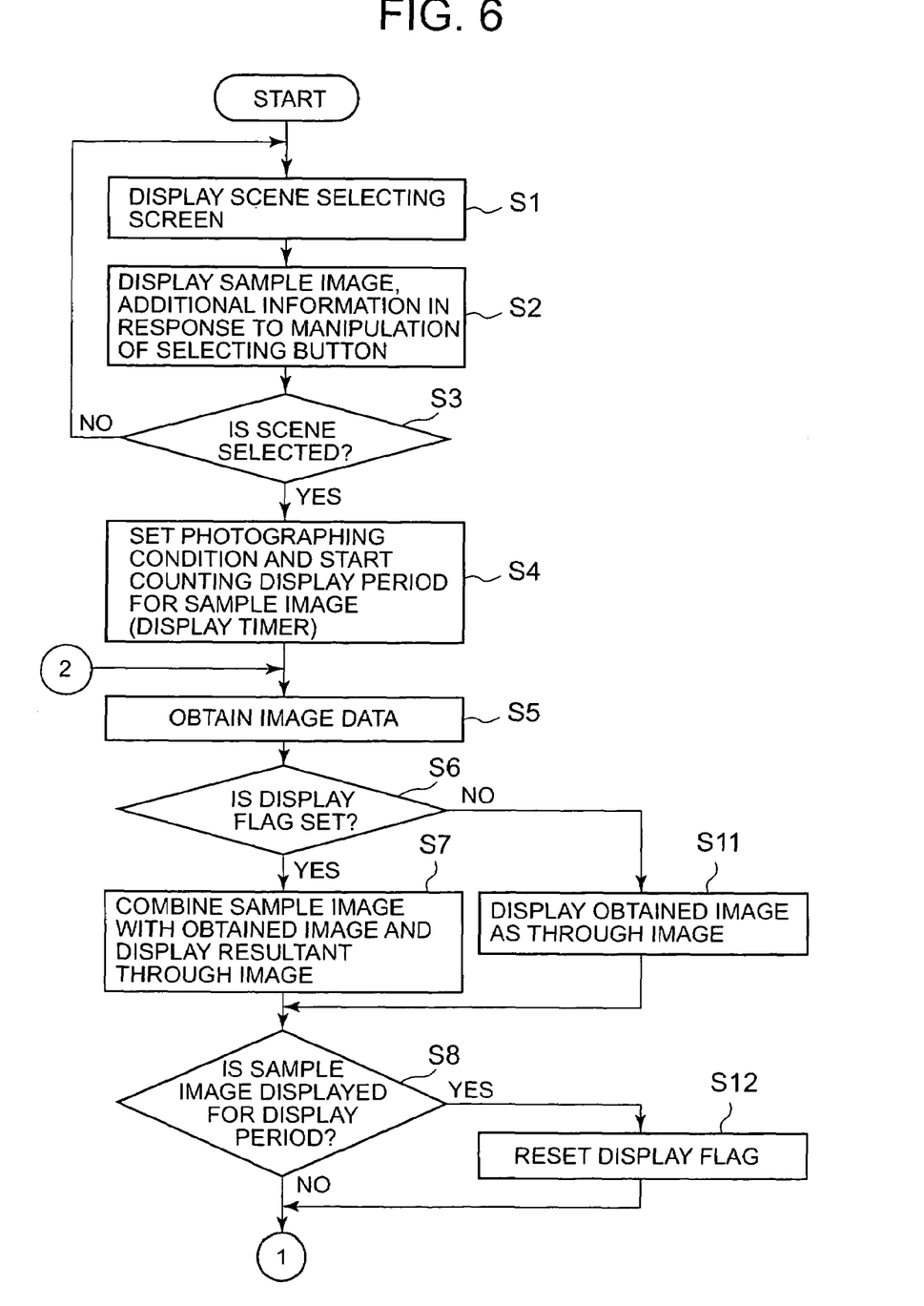
FIGS. 6 and 7 are flow charts showing a photographing operation of the electronic still camera in a best shot mode in a first embodiment of the invention.
Figure 7:
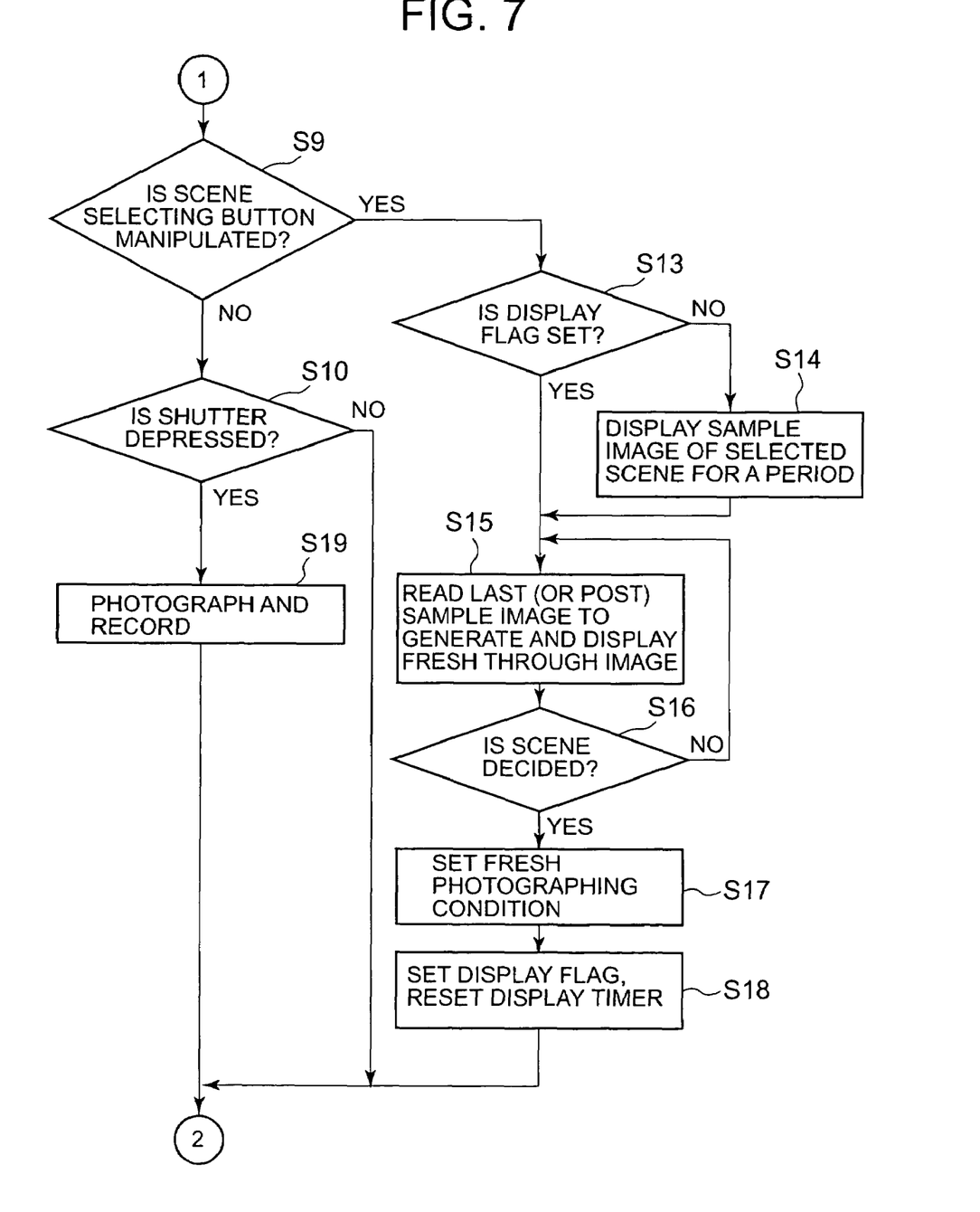

Now, an operation of the electronic still camera 1 as set forth above will be described, in which a best shot mode has been selected by manipulation of the menu key 59 by a user with the recording mode (REC mode) being set. FIGS. 6 and 7 are flow charts showing processes performed by the control section 3 in the best shot mode.

Figure 8:
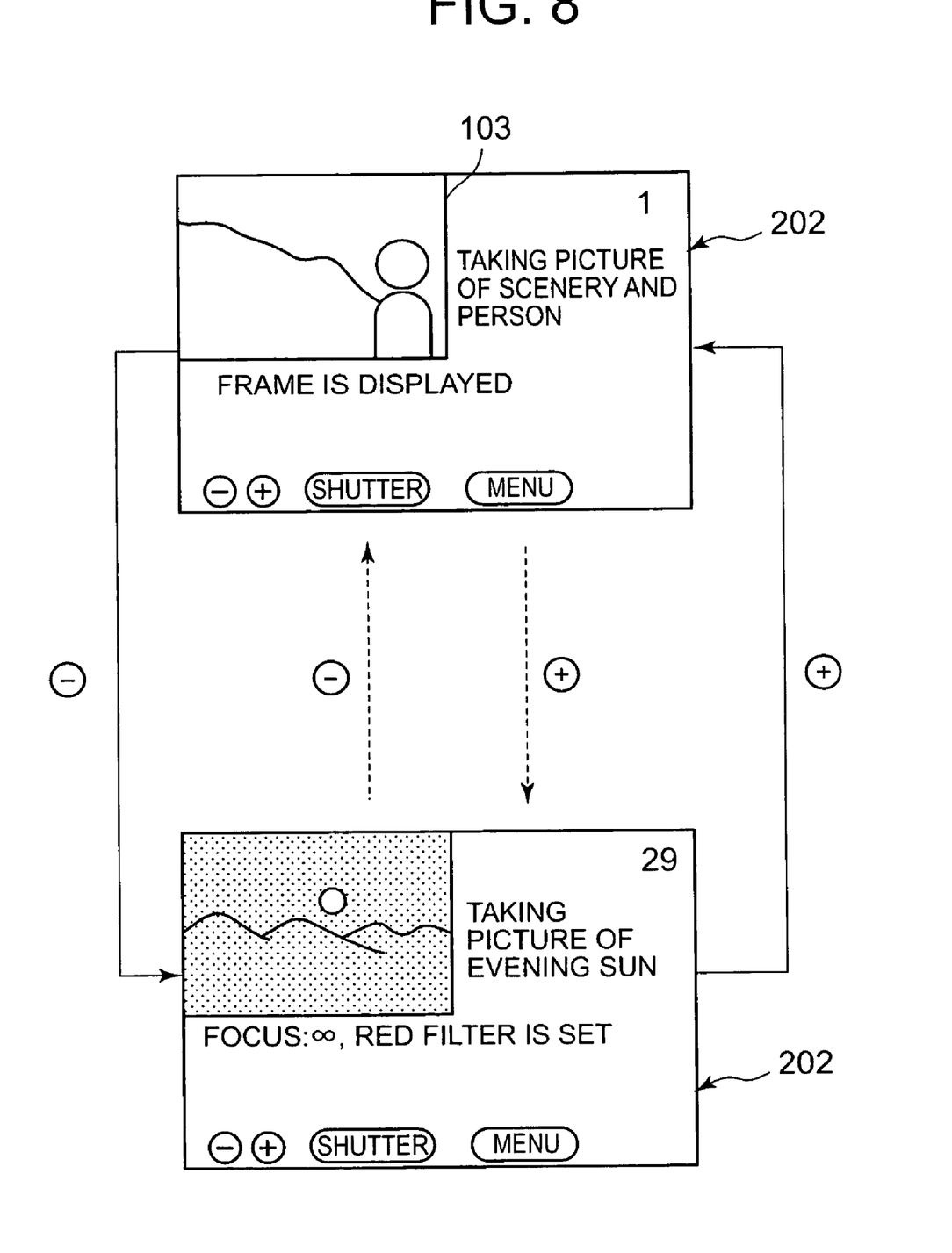
FIG. 8 is a view illustrating a scene selecting screen and its transition.

At first, the control section 3 reads out the photographing condition data 101 (refer to FIG. 3), the additional information data 102 (refer to FIG. 4), and image data (refer to FIGS. 5A, 5B and 5C), and displays a scene selecting screen 202 as shown in FIG. 8 at step S1 in FIG. 6. The scene selecting screen 202 includes one of scene numbers (from "1" to "29" in the present embodiment) corresponding respectively to the photographing condition data 101, the corresponding sample image 103, scene explanation data ("Scenery and Person are photographed"), advice data ("Frame is displayed"), and control explanation data ("Focus is set to infinity, and red filter is set").

The scene number changes in ascending order or descending order in response to operation of a selection button, and data corresponding to the displayed scene number are sequentially read out and displayed on the scene selecting screen 202 at step S2.

Figure 9:
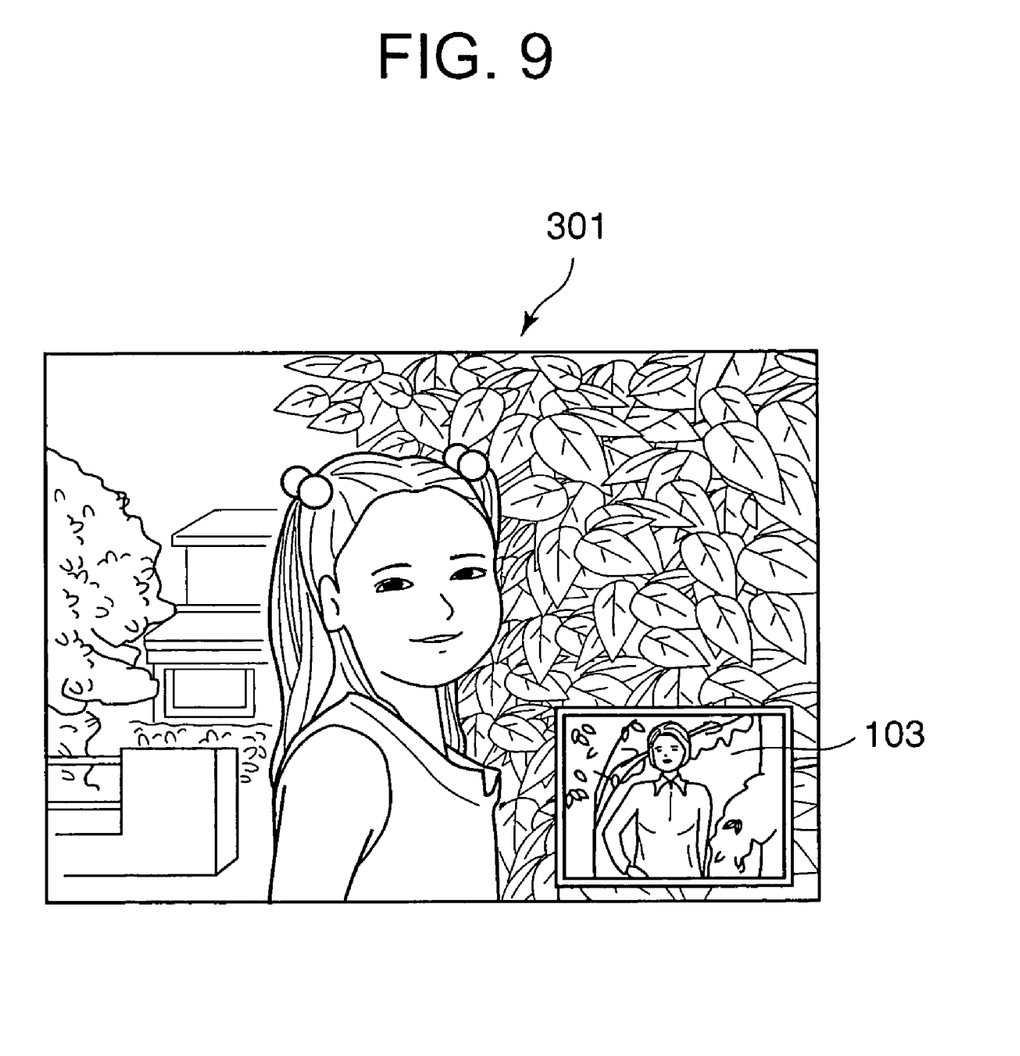
FIG. 9 is a view illustrating a sample of a through image displayed immediately after the electronic still camera has been brought into a standby state for taking a picture.

When, upon depression of the shutter key (decision key) 53, a scenery displayed based on the sample image 103 is selected and decided at step S3 (YES), the control section 3 reads out the photographing condition data 101 (various control parameters) of the scene number corresponding to the decided scenery and sets photographing condition to the electronic still camera 1 based on the read out control parameters and further starts counting, within the control section 3, a time during which the sample image is displayed at step S4. Then, CCD 2 produces a pick-up image data corresponding to an optical image of the subject to be photographed at step S5. The control section 3 judges at step S6, if a display flag has been set, which indicates whether the sample image is displayed or not. The display flag has been set (step S6: YES), immediately after a scenery is selected on the scene selecting screen 202, and the sample image 103 corresponding to the scene number displayed in the scene selecting screen 202 is combined with the pick-up image obtained by CCD 2 at a predetermined position thereof, and the combined image is displayed as a through image on the TFT liquid crystal display monitor 18 at step S7. Now, the electronic still camera 1 is brought into a standby state for taking a picture (standby state). A view of FIG. 9 illustrates a sample of the through image 301, in which the sample image 103 combined into the pick-up image is displayed in the lower right-hand corner (combined position) of the pick-up image. The combined position may be other than the lower right-hand corner. In other words, the sample image 103 may be combined into and displayed in a position other than the lower right-hand corner of the pick-up image. In the standby state, it is judged at step S8 whether the sample image 103 has been displayed for a predetermined time period (displaying period) or not, for instance, for two seconds. When it is determined at step S8 that the sample image 103 has not been displayed for the predetermined time period (displaying period), it is judged at step S9 whether the scene selecting button has been manipulated or not. When it is determined at step S9 that the scene selecting button has not been manipulated, it is judged at step S10 whether the shutter key has been manipulated or not. When it is determined at step S10 that the shutter key has not been manipulated, the control section 3 returns to the process of step S5, and repeatedly performs processes for combining the sample image 103 into the through image 301 and for displaying the through image thus combined.

Meanwhile, when it is determined at step S8 that the sample image 103 has been displayed for the predetermined time period (displaying period), the display flag is reset at step S12, thereafter in the standby state, the pick-up image with no sample image combined is displayed as the through image on the TFT liquid crystal display monitor 18 at step S11 (with step S6: NO). In other words, the sample image 103 is removed from the through image 301. When the user manipulates at step S9 the scene selecting button in the standby state for taking a picture, where either of the through image 301 with the sample image 103 combined therewith and the through image 301 with no sample image 103 combined therewith is displayed, it is judged at step S13 whether the display flag has been set or not, or whether the sample image 103 is being displayed on the TFT liquid crystal display monitor 18 or not. When no sample image 103 is displayed on the monitor 18 (step S13: NO), then the sample image 103 which corresponds to the scene number selected at that time and has been removed from the through image 301 after the displaying period lapsed, is combined into the through image to be displayed again only for a certain period of time (for example, for one second) at step S14, and then the process advances to step S15. In case that it is determined at step S13 that the display flag has been set and the through image 301 with the sample image 103 combined therewith is displayed on the monitor 18, the process advances directly to step S15 without performing the process at step S14.

At step S15, other sample image data is read out in response to manipulation of the scene selecting button, which sample image data represents a photographing scene following or prior to the photographing scene that has been selected, and the sample image that has been combined with the through image is replaced with another sample image corresponding to the read out sample image data. And the process at step S15 is repeatedly performed until the photographing scene is selected by manipulation of the related key at step S16. When the photographing scene has been selected at step S16, the photographing condition data 101 is read out, which data corresponds to the scene number of the sample image which is on the monitor 18 at the time of the photographing scene selection, and the photographing condition for the electronic still camera 1 is changed based on the read out photographing condition data at step S17. The control section 3 sets the display flag and starts counting the displaying period during which the sample image 103 is displayed on the monitor 18, and then returns to step S5. Thereafter, a new image data produced under the changed photographing condition is combined with a new sample image and displayed on the TFT liquid crystal display monitor 18 as a through image 301.

When the shutter key is manipulated in the standby state (state ready for taking a picture), during which the process set forth above is performed, at step S10, the image pick-up operation is performed under the photographing condition which has been set at that time, and the pick-up image is stored at step S19. Thereafter, the process returns to step S5, and the processes at step S5 and at the following steps are repeatedly performed as long as the best shot mode of the recording mode is held.

In a similar manner as in a conventional camera, in the embodiment of the present invention, a simple manipulation by the user such as a manipulation to select a sample image corresponding to the subject he or she wants to photograph allows the user to take a picture under the photographing conditions suitable for various subjects to be photographed and photographing circumstances or scenes, or under the photographing condition set to the user's liking.

In addition, in the present embodiment of the invention, when the user selects the photographing scene to bring the electronic camera 1 to the standby state for taking a picture, a through image 301 with a sample image 103 combined therewith is displayed for the certain period of time, and the user is allowed to confirm the photographing scene selected by himself or herself during the certain period of time through the sample image again. Further, after the certain period of time has lapsed, the through image with no sample image 103 combined therewith is displayed and the sample image does not disturb the user in determining a frame of the photograph. As set forth above, the invention provides the camera which is easier-to-use in the best shot mode for a photographer compared with the conventional apparatus.

In the present embodiment, the sample image 103 disappears from the through image 301 when the certain period of time has lapsed after the photographing scene is selected, but the sample image 103 may be kept displayed all the times. In this case it is preferable to reduce the sample image in size to the extent that the photographing scene can be confirmed. Further, the embodiment may be modified such that when the certain period of time has lapsed after the photograph scene is selected, the sample image 103 to be combined with the through image 301 is made smaller in size than ever.

In the present embodiment, when the scene selecting button is manipulated with the through image 301 displayed in the standby state ready for taking a picture, the sample images 103 representing photographing scenes to be selected for combination with the through image 301 are successively displayed in the order of the scene numbers or in the opposite order thereof, allowing the user to select his or her desired photographing scene and to change the photographing condition suitable for the newly selected photographing scene to display the through image 301 under the changed photographing condition. Therefore, since the user is allowed to change the photographing condition any time while confirming the subject to be photographed, the camera according to the present invention may be used more conveniently by the user than the conventional camera.

[Modification to the First Embodiment]

In the first embodiment set forth above, the sample image 103 to be combined with the through image 301 displayed on the monitor in the standby state for taking a picture, must have the same orientation as that of the sample image 103 to be displayed in the scene selecting screen 202 (shown in FIG. 8), but the modification may be made to the first embodiment, as will be described below. When the sample image 103 to be combined with the through image 301 is of a portrait, the sample image 103 is displayed in the portrait orientation. In this case, the orientation of the sample image 103 coincides with the orientation of the camera body which is rotated and held in the portrait orientation. As a result, the user can confirm that the selected scene is of the portrait orientation without feeling uncomfortable. For easy judgment of whether the sample image 103 being of the portrait or of the landscape orientation, the electronic camera may be arranged to previously hold-data for indicating whether the sample image 103 is of a portrait or of a landscape together with data of the sample image 103.

Apart from the above modification, in a further modified embodiment there is provided a sensor for detecting the orientation or the angle of the camera body. In the modified embodiment, the camera angle is detected by the sensor, and the through image with the sample image combined therewith is displayed according to the detected camera angle at steps S7, S14 and S15, such that the top and bottom of the sample image coincide with those of the screen of the TFT liquid crystal display monitor 18. The modified embodiment will provide the electronic camera which may be used more conveniently by the user without feeling uncomfortable. In a still further modified embodiment, sample images of a portrait and of a landscape are previously prepared for the same scene, and these sample images are used depending on the angle of the camera body. In the instant embodiment, an operation to rotate the sample image is not required to combine the sample image with the through image, and therefore, a load to be processed by the control section 3 is decreased.

[Second Embodiment]

Figure 10:
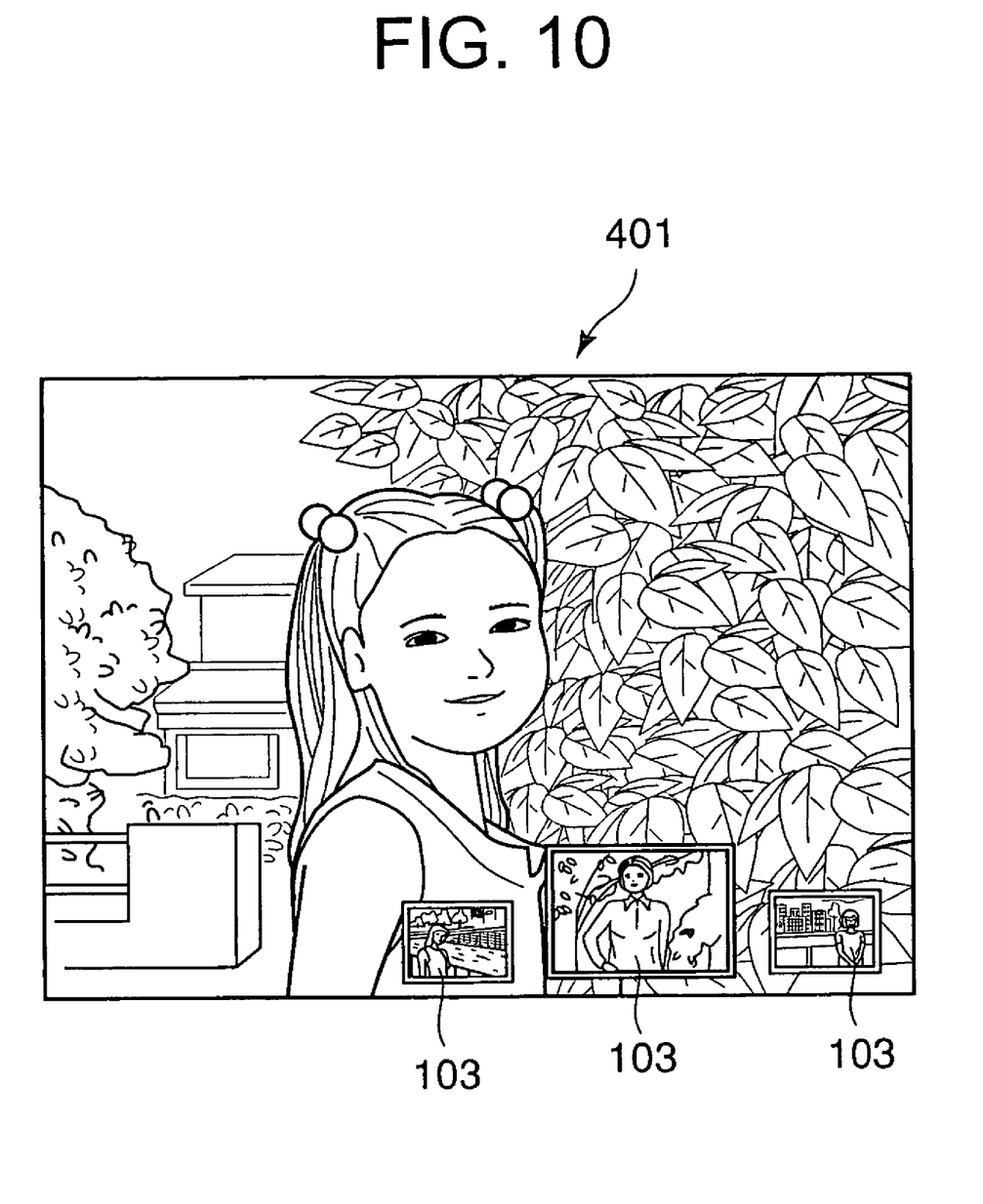
FIG. 10 is a view illustrating a sample of a through image displayed in a scene changing operation in a second embodiment of the invention.

Now, the second embodiment of the present invention will be described. In an electronic still camera according to the second embodiment has the same configuration as the first embodiment, when the photographing scene is selected by manipulation of the scene selecting button in the standby state for photographing in the best shot mode, a through image 401 shown in FIG. 10 is displayed. In the first embodiment, only the sample image of the photographing scene which is selected at the time is combined with the through image 301, but in the second embodiment, the through image 401 is combined with three images, that is, the photographing image 103 selected at the time, and two sample images 103 (one corresponding to the last scene number and other corresponding to the post scene number). The photographing image 103 selected at the time is displayed larger in size than other two sample images. The processes other than the process for displaying the through image 401 are the same as those in the first embodiment.

In the second embodiment, since the user can easily select his or her desired photographing scene in the standby state for taking a picture, user-friendliness of the electronic camera is improved.

In the second embodiment, the sample image of the selected photographing scene is displayed larger than other images, but the size of the sample image may be the same as other images. In this case, it is necessary to indicate which one is the selected photographing scene or the corresponding sample image, for example, by surrounding the image with a frame of a certain color. As described above, the through image 401 is combined with the sample image of the selected photographing scene and the two sample images corresponding to the last scene number and the post scene number, as shown in FIG. 10, but the arrangement may be modified such that either the sample images corresponding to last two scene numbers or the sample images corresponding to post two scene numbers may be combined with the through image and further four sample images including that of the photographing scene may be combined with the through image.

In the instant embodiment, in which plural sample images including that of the selected photographing scene are displayed, the following process may be employed. That is, the photographing condition data 101 are previously classified with respect to subjects to be photographed such as a person, scenery, sports and etc., and the sample image of the selected photographing scene, and other sample images which are classified into the same group to which the selected photographing scene belongs are displayed. In this case, the user can select a photographing scene (sample image) similar to the selected photographing scene without any difficulty.

In the first and the modified first embodiments and the second embodiment, when the user selects a photographing scene in the standby state in the best shot mode, the sample image representing the photographing scene is displayed, but these embodiments may be modified such that the scene explanation or the additional information 102 (FIG. 4), which is displayed in the scene selecting screen shown in FIG. 8, may be displayed over the through image in place of the sample image. Also, in modified embodiment, the user can confirm the photographing scene selected by himself or herself, when the camera is brought into the standby state where the photographing scene is selected. Further, the user is allowed to change the photographing condition while reviewing the subject, an easy-to-use camera is available.

What is claimed is:

1. A camera apparatus comprising:

a display device for displaying, in a standby state for taking a picture, an optical image of a subject to be photographed;

a memory for storing plural photographing condition data corresponding to respective different photographing conditions, and plural sample images representing images of the subject, wherein the plural sample images correspond to the plural photographing condition data, respectively;

a selector for selecting one of the sample images stored in the memory in response to a selecting operation;

a selection starting unit for causing the selector to start selection of the sample image;

a photographing-condition setting unit for setting a photographing condition to the camera apparatus based on the photographing condition data corresponding to the sample image selected by the selector in response to a decision operation; and a display controller for controlling the display device to display the sample image corresponding to the photographing condition set by the photographing-condition setting unit together with the optical image of the subject which is picked up by the camera apparatus based on the photographing condition set by the photographing-condition setting unit;

wherein the selector restarts selection of the sample image when the selection starting unit causes the selector to start selection of the sample image after the photographing condition has been set by the photographing-condition setting unit;

wherein the display controller controls the display device to cease displaying the sample image after displaying the sample image for a predetermined period of time;

wherein a judging unit judges whether or not the display controller displays the sample image on the display device, when the selection starting unit has caused the selector to start selection of the sample image; and wherein the display controller controls the display device to display the sample image corresponding to the photographing condition currently set by the photographing-condition setting unit, when the judging unit determines that the sample image is not displayed on the display device.

2. The camera apparatus as set forth in claim 1, wherein the display controller controls the display device to display the sample image together with the optical image of the subject for a predetermined period, and then to display only the optical image of the subject after the predetermined period.

3. The camera apparatus as set forth in claim 1, wherein the selector successively changes the sample image in response to the selecting operation, and the display controller controls the display device to display the successively changed sample images, thereby allowing a user to select one of the sample images from among the successively displayed sample images.

4. The camera apparatus as set forth in claim 1, wherein the display controller controls the display device to display the sample image before the photographing condition is set by the photographing-condition setting unit, and the selector selects the displayed sample image in response to the selecting operation.

5. The camera apparatus as set forth in claim 1, wherein the display controller controls the display device to display another sample image in place of the currently displayed sample image when the judging unit determines that the sample image is displayed on the display device, and wherein the display controller controls the display device to display a next sample image in place of the displayed sample image when the judging unit determines that the sample image is not displayed on the display device, whereby the selector allows a user to select the photographing condition again.

6. The camera apparatus as set forth in claim 1, wherein the display controller controls the display device to display respective ones of the sample images in response to the selecting operation of the selector, and wherein the selector selects the sample image from among the displayed sample images.

7. The camera apparatus as set forth in claim 1, wherein the display controller controls the display device to display a plurality of the sample images together with the optical image of the subject.

8. The camera apparatus as set forth in claim 1, wherein the display controller controls the display device to display the sample image currently selected by the selector and another one of the sample images in a manner discernible one from other.

9. The camera apparatus as set forth in claim 1, wherein the memory stores the plural sample images in a predetermined storing order, and the display controller controls the display device to display the sample image selected by the selector and a sample image adjacent to the selected sample image in the storing order together with the optical image of the subject.

10. The camera apparatus as set forth in claim 9, wherein the display controller controls the display device to display the sample image selected by the selector and the sample image adjacent to the selected sample image in a manner discernible one from other.

11. A display method for a camera apparatus which includes a display device and a memory storing plural photographing condition data corresponding to respective different photographing conditions and plural sample images representing images of a subject, wherein the plural sample images correspond to the plural photographing condition data, respectively, said display method comprising:

displaying on the display device an optical image of the subject to be photographed, in a standby state for taking a picture;

selecting one of the sample images stored in the memory in response to a selecting operation;

controlling selection of the sample image to be started;

setting a photographing condition to the camera apparatus based on the photographing condition data corresponding to the sample image selected in response to a decision selecting operation;

controlling the display device to display the sample image corresponding to the set photographing condition together with the optical image of the subject which is picked up by the camera apparatus based on the photographing condition set by the photographing-condition setting unit;

restarting selection of the sample image when the selection of the sample image is controlled to be started after the photographing condition has been set;

controlling the display device to cease displaying the sample image after displaying the sample image for a predetermined period of time;

judging whether or not the sample image is displayed on the display device, when the selection of the sample image has been controlled to be started; and controlling the display device to display the sample image corresponding to the currently set photographing condition, when it is judged that the sample image is not displayed on the display device.

12. A computer readable medium having recorded thereon a computer program for controlling a camera apparatus, which includes a display device and a memory storing plural photographing condition data corresponding to respective different photographing conditions and plural sample images representing images of a subject, wherein the plural sample images correspond to the plural photographing condition data, respectively, to perform functions of:

displaying on the display device an optical image of the subject to be photographed, in a standby state for taking a picture;

selecting one of the sample images stored in the memory in response to a selecting operation;

controlling selection of the sample image to be started;

setting a photographing condition to the camera apparatus based on the photographing condition data corresponding to the sample image selected in response to a decision selecting operation;

controlling the display device to display the sample image corresponding to the set photographing condition together with the optical image of the subject which is picked up by the camera apparatus based on the photographing condition set by the photographing-condition setting unit;

restarting selection of the sample image when the selection of the sample image is controlled to be started after the photographing condition has been set;

controlling the display device to cease displaying the sample image after displaying the sample image for a predetermined period of time;

judging whether or not the sample image is displayed on the display device, when the selection of the sample image has been controlled to be started; and controlling the display device to display the sample image corresponding to the currently set photographing condition, when it is judged that the sample image is not displayed on the display device.

* * * * *